3,030,335
AROMATIC POLYCARBONATE REACTION
PRODUCTS
Eugene P. Goldberg, Glens Falls, N.Y., assignor to General Electric Company, a corporation of New York
No Drawing. Filed Jan. 2, 1959, Ser. No. 784,430
9 Claims. (Cl. 260—47)

This invention relates to polycarbonate resins having desirable physical, chemical and electrical properties and to their preparation. More particularly, it relates to polycarbonate compositions containing as a copolymer polycarbonate compositions derived from aliphatic dihydroxy compounds and dihydric phenol compounds, the resulting copolymers being cross-linked or extended by means of organic polyisocyanate material.

Various types of polycarbonate resins are known among which are those prepared by the ester interchange of carbonate esters with glycols and by the reaction of dihydroxymonoaryl compounds such as hydroquinone and resorcinol with phosgene or carbonate esters. Improved characteristics are obtained for many purposes from copolymers derived from dihydric phenols and other dihydroxy compounds. While such copolymer compositions are characterized by good physical, chemical and electrical properties and have a relatively high softening point, as well as desirable tensile strength, impact strength and even in certain instances rubber-like elastic properties, they are quite readily soluble in certain organic solvents, such as dioxane, chloroform, methylene chloride, tetrahydrofuran, dimethylformamide and chlorobenzene among others so that their final use is limited to those applications in which they do not come into contact with such organic solvents. Furthermore, while their softening point is generally of the order of about 150–200° C. they are still thermoplastic materials and as such are not suitable for uses, such as in electrical equipment and the like where temperatures in excess of 150–200° C. are often encountered.

Briefly stated, the compositions of this invention comprise carbonate copolymers of dihydric phenols with aliphatic dihydroxy compounds, said copolymers being cross-linked or extended by means of organic polyisocyanate compounds.

In general, any aliphatic dihydroxy compound or glycol can be used for the preparation of the carbonate copolymers. Included are the lower molecular weight aliphatic dihydroxy compounds such as ethylene glycol, propanediols, butanediols, pentanediols, hexanediols, heptanediols, octanediols, neopentyl glycol, aryl-alkyl glycols such as styrene glycol, xylylene glycols, dihydroxy alkyl ethers of dihydric phenols such as the dihydroxy ethyl ether of Bisphenol-A, thiodiglycols and cycloaliphatic glycols such as 1,4-dihydroxycyclohexane, 2,2-bis-(4-hydroxycyclohexyl) - propane, bis-(4-hydroxycyclohexyl)-methane, among others. Among the useful higher molecular weight aliphatic dihydroxy compounds are the polyethylene glycols, polystyrene glycols, polypropylene glycols, polybutylene glycols, polythioglycols, poly-arylalkyl ether glycols and copolymer polyether glycols, the latter typified by polyethylene glycol-polypropylene glycol copolymers sold by Wyandotte Chemical Company and known as Pluronics, etc. Included also are dihydroxy compounds such as may be derived from dibasic acids and glycols; for example, the diethyleneglycol ester of adipic acid, or the diethyleneglycol ester of sebacic acid, the dineopentyl glycol ester of adipic acid or terephthalic acid, etc. Further glycols useful in connection with the invention are silanediols such as diphenylsilanediol, dimethylsilanediol, dimethylsilanediol dimer, methylphenylsilanediol, ethylphenylsilanediol, etc. Tertiary aminoglycols are also useful, including among others, N-phenyldiethanolamine, N-methyldiethanolamine, N-propyldiethanolamine and N-phenyldi-n-propanolamine. Any polymeric aliphatic material having hydroxyl end groups is useful, including polyethers, polyesters, polyurethanes, polyacetals and polysiloxanes. The aliphatic dihydroxy compounds or glycols can typically be represented by the formula:

(I)
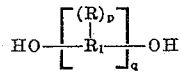

where R is hydrogen or a monovalent hydrocarbon radical, for example alkyl radicals (e.g., methyl, ethyl, propyl, isopropyl, butyl, decyl, etc.), aryl radicals (e.g. phenyl, naphthyl, biphenyl, tolyl, xylyl, etc.), aralkyl radicals (e.g. benzyl, ethylphenyl, etc.), cycloaliphatic radicals (e.g. cyclopentyl, cyclohexyl, etc.), as well as monovalent hydrocarbon radicals containing inert substituents thereon, such as halogen (chlorine, bromine, fluorine, etc.). It will be understood that where more than one R is used, they may be alike or different. $R_1$ can be selected from the group consisting of alkylene and alkylidene residues such as methylene, ethylene, propylene, propylidene, isopropylidene, butylene, butylidene, isobutylidene, amylene, isoamylene, amylidene, isoamylidene, etc. $R_1$ can also be a silane radical or can be polyalkoxy such as polyethoxy, polypropoxy, polythioethoxy, polybutoxy, polyphenylethoxy, or polyorganosiloxy, for example polydimethylsiloxy, polydiphenylsiloxy, polymethylphenylsiloxy, etc. $R_1$ can also consist of two or more alkylene or alkylidene groups such as above, separated by an aromatic group, a tertiary amino group, an ether group, a carbonyl group, a silane group, or by a sulfur containing group such as sulfide, sulfoxide, sulfone, etc. $R_1$ may also be a glycol dibasic acid ester residue derived from, for example, dibasic acids such as adipic, azelaic, sebacic, isophthalic, terephthalic and glycols such as have been disclosed above. Other groupings which can be represented by $R_1$ will occur to those skilled in the art. The ester residue can be polymeric or monomeric. The subscript $p$ can be a whole number including zero. The subscript $q$ is an integer which may be varied as desired and $R_1$, where $q$ is more than 1, may be like or different radicals. It is understood, of course, that mixtures of different glycols may be used and where glycol is mentioned, such mixtures are considered to be included. Any dihydric phenol compound is useful in the practice of the invention. The dihydric phenol compounds used in connection with the preparation of the carbonate copolymers can typically be represented by the general formula:

(II)
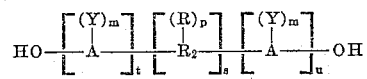

where R is a monovalent hydrocarbon radical as above, $R_2$ is selected from the group consisting of an alkylene and alkylidene residue in the same sense as $R_1$ or an ether, a sulfur containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by an aromatic group, a tertiary amino group, an ether group or by a carbonyl group, a silane group or by a sulfur-containing group such as sulfide, sulfoxide, sulfone, etc. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers including zero. When $s$ is zero, however, either $t$ or $u$ may be zero but not both.

In the dihydric phenol compound, the substituent Y may be the same or different as may be the R. Monovalent hydrocarbon radicals designated by R can be the same as those in reference to the compound of Formula I above, as may be those represented by $R_1$. Among the substituents represented by Y are halogen (e.g. chlorine, bromine, fluorine, etc.) or oxy radicals of the formula OW, where W is a monovalent hydrocarbon radical similar to R, or monovalent hydrocarbon radicals of the type represented by R. Other inert substituents such as a nitro group can be represented by Y. Where $s$ is zero in Formula II, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenol)-propane (Bisphenol-A); 2,4'-dihydroxydiphenyl-methane; bis-(2-hydroxyphenol)-methane; bis-(4-hydroxyphenyl)-methane; bis-(4-hydroxy-5-nitrophenyl) - methane; bis-(4-hydroxy-2,6-dimethyl-3-methoxyphenyl)-methane; 1,1-bis-(4-hydroxyphenyl)-ethane; 1,2-bis-(4-hydroxyphenyl)-ethane; 1,1-bis-(4-hydroxy-2-chlorophenyl) - ethane; 1,1-bis-(2,5-dimethyl-4-hydroxyphenyl) - ethane; 1,3-bis-(3-methyl-4-hydroxyphenyl)-propane; 2,2 - bis-(3-phenyl-4-hydroxyphenyl)-propane; 2,2-bis-(3-isopropyl-4-hydroxyphenyl)-propane; 2,2-bis-(4 - hydroxynaphthyl) - propane; 2,2-bis-(4-hydroxyphenyl)-pentane; 3,3-bis-(4-hydroxyphenyl)-pentane; 2,2-bis-(4-hydroxyphenyl)-heptane; bis-(4-hydroxyphenyl)-phenyl methane; bis-(4-hydroxyphenyl)-cyclohexyl methane; 1,2-bis-(4-hydroxyphenyl)-1,2-bis-(phenyl) ethane; 2,2-bis-(4-hydroxyphenyl)-1,3-bis-(phenyl) propane; 2,2-bis-(4-hydoxyphenyl)-1-phenyl propane; and the like. Also included are dihydroxybenzenes typified by hydoquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene etc. Dihydroxy aryl sulfones such as those set forth in application Serial No. 613,817, filed October 4, 1956, assigned to the same assignee as this invention are also useful, e.g. bis-(p-hydroxyphenyl)-sulfone; 2,4'-dihydroxydiphenyl sulfone; 5'-chloro-2,4'-dihydroxydiphenyl sulfone; 5'-chloro-2',4-dihydroxydiphenyl sulfone; 3'-chloro-4,4'-dihydroxydiphenyl sulfone; bis-(4-hydroxyphenyl) biphenyl disulfone, etc. The preparation of these and other useful sulfones is described in Patent 2,288,282—Huissmann. Polysulfones as well as substituted sulfones using halogen, nitrogen, alkyl radicals etc. are also useful. Dihydroxy aromatic ethers such as those set forth in application Serial No. 598,768, filed July 19, 1955, assigned to the same assignee as this invention are also useful. Methods of preparing such materials are found in "Chemical Reviews," 38, 414–417 (1956), and Patent 2,739,171—Linn. Exemplary of such dihydroxy aromatic ethers are p,p'-dihydroxydiphenyl ether; p,p'-dihydroxytriphenyl ether; the 4,3'-, 4,2'-, 4,1'-, 2,2'-, 2,3'-, etc. dihydroxydiphenyl ethers; 4,4'-dihydroxy-2,6-dimethyldiphenyl ether; 4,4' - dihydroxy-2,5-dimethyldiphenyl ether; 4,4'-dihydroxy-3,3'-di-isobutyldiphenyl ether; 4,4'-dihydroxy-3,3'-diisopropyldiphenyl ether; 4,4'-dihydroxy-3,2'-dinitrodiphenyl ether; 4,4'-dihydroxy-3,3'-dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy 3,3'-dichlorodinaphthyl ether; 2,4-dihydroxytetraphenyl ether; 4,4'-dihydroxypentaphenyl ether; 4,4'-dihydroxy-2,6-dimethoxydiphenyl ether, 4,4'-dihydroxy-2,5-diethoxydiphenyl ether, etc. Mixtures of the dihydric phenols can also be employed and where dihydric phenol is mentioned herein, mixtures of such materials are considered to be included.

Generally speaking, the carbonate copolymers useful in connection with this invention are prepared by reacting a dihydric phenol compound, a carbonate precursor such as phosgene, a carbonate ester etc. and an aliphatic dihydroxy material or glycol.

When a carbonate ester is used, the materials are reacted at temperatures of from about 150° C. to 300° C. or higher for times varying from 1 to 15 or more hours. Under such conditions, an ester interchange occurs between the carbonate ester and the dihydric phenol compound. The ester interchange is advantageously carried out at reduced pressures of around 10 to 100 mm. of mercury preferably in an inert atmosphere such as of nitrogen, argon, krypton, etc. to prevent undesirable oxidative effects, especially where higher reaction temperatures are used under moderate subatmospheric pressures. Heating under vacuum after the ester interchange is substantially complete (vacuum cooking), for example, at from 150° C. to 300° C. at 0.01 to 5 to 10 mm. of mercury for extended periods of time tends to increase the molecular weight of the carbonate polymer.

Although the reaction can be carried out in the absence of a catalyst, one may, if desired, use the usual ester exchange catalysts, for instance metallic lithium, potassium, calcium, beryllium, magnesium, zinc, cadmium, aluminum, chromium, molybdenum, iron, cobalt, nickel, silver, gold, tin, antimony, lead, barium, strontium, platinum, palladium, etc. and compounds thereof such as alcoholates, oxides, carbonates, acetates, hydrides, etc. Additional catalysts and variations in the ester exchange methods are discussed in Groggins, "Unit Processes in Organic Synthesis" (4th Edition, McGraw-Hill Book Company, 1952), pages 616 to 620. The amount of such catalyst is usually quite small and is of the order of 0.001 to 0.1% by weight, based on the total weight of the reactants.

The diaryl carbonates useful in this connection can be represented by the general formula:

(III)
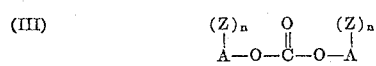

where A is an organic residue in the same sense as in Formula II, Z is an inorganic or organic radical in the same sense as Y of Formula II, and $n$ is an integer. Examples of carbonate esters comprise symmetrical carbonates, for example diphenyl carbonate, di-(halo-phenyl) carbonates, e.g. di-(chlorophenyl) carbonate, di-(bromophenyl) carbonate; di-(polyhalophenyl) carbonates, e.g. di-(trichlorophenyl) carbonate, di-(tribromophenyl) carbonate, etc.; di-(alkylphenyl) carbonates, e.g. di-(tolyl) carbonate, etc., di-(naphthyl) carbonate, di-(chloronaphthyl) carbonate, etc.; unsymmetrical carbonates, for example phenyl tolyl carbonate, chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916), and Copisarow, J. Chem. Soc. (Brit.) 1929, 251, both of whom disclose preparing dicresyl carbonate by treating the alkali metal salts of p-cresol with phosgene, and U.S. Patent 2,362,865—Tryon et al., which discloses preparing diphenyl, ditolyl, and dinaphthyl carbonates by passing phosgene through a column of the phenol in the presence of a catalyst, etc.

Employing the above method of preparing the present copolymers by ester interchange, using a vacuum cook, the products in the final stages of the reaction become quite viscous and difficult to handle. In addition, the ester exchange process is not entirely satisfactory for preparing block copolymers when certain high molecular weight glycol materials such as polyester glycols are used, due to ester exchange reactions involving the polyester linkages of the glycol itself. I therefore prefer generally to carry out the reaction using phosgene or phosgene-like dibasic acid halide in an organic basic material such as a tertiary amine (e.g. pyridine, n-dimethylaniline, quinoline, etc.). The base can be used undiluted or diluted with inert solvents, for example hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction. Although the phosgene reaction can be carried out over a wide range of temperatures, for example from below 0° C. to over 100° C., the reaction proceeds satisfactorily at 25° to 50° C. Since the reaction is exothermic, the rate of phosgene addition can be used to control the reaction temperature. Substantially, equimolar amounts of phosgene can be used, although an excess of up to 1.5 moles or more may be employed. The concentration of the dihydroxy reactants in solvent can also be varied, although I prefer for convenience a solution containing from about 1% to 25% by weight of dihydroxy compounds.

In general, the reaction is carried out by dissolving the dihydroxy reactants in the base, such as pyridine, and then bubbling phosgene into the stirred solution at the desired rate. The copolymer formed is separated and purified by any suitable means, as by pouring the reaction product into a stirred liquid capable of effecting precipitation, for example: hydrocarbons, alcohols, etc. The precipitation can also be carried out by the addition of a non-solvent to the copolymer solution. Anhydrous precipitants are preferred but water can also be used. After filtration, the precipitate is washed with a material capable of removing pyridine and pyridine hydrochloride to yield, upon drying, a finely divided product. Isopropanol is conveniently used both as a precipitating and washing agent.

Suitable phosgene-like dibasic acid halides, in addition to phosgene, include, for example, dibromo and diiodocarbonyls as well as the bishaloformates of dihydric phenols (e.g. bischloroformates of hydroquinone, Bisphenol-A etc.) or glycols (e.g. bischloroformates of ethyleneglycol, neopentyl glycol, polyethylene glycol etc.). Other carbonate precursors will occur to those skilled in the art.

Copolymers can also be prepared by adding phosgene to an aqueous alkaline solution or suspension of the dihydroxy reactants. This is preferably done in the presence of inert solvents such as methylene chloride, benzene, toluene and the like. Quaternary ammonium compounds can be used to catalyze the reaction.

It will be seen that whether a carbonate ester or phosgene is used in the reaction, the dihydric phenol will produce a dihydric phenol carbonate structural unit which can typically be represented by the following general formula wherein the various letters have the same meaning as above:

(IV) 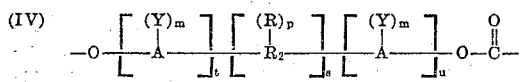

It will likewise be seen that the aliphatic dihydroxy material or glycol will during the reaction produce a glycol carbonate structural unit which typically can be represented by the following general formula wherein the various letters have the same meaning as above:

(V) 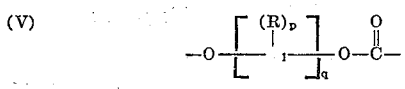

The preparation of the above copolymers is more specifically set forth in copending application, Serial No. 638,239, filed February 5, 1957, assigned to the same assignee as this invention, said copending application being incorporated herein by reference.

The preparation of copolymers which can be crosslinked or extended according to the present invention is illustrated below, these examples being merely illustrative, rather than limiting, in their scope.

Example 1

To a reaction vessel there was added 45.6 g. (0.20 mole) Bisphenol-A and 3.1 g. (0.05 mole; 20 mole percent) of ethylene glycol in 500 cc. of dry pyridine. Phosgene was admitted to the reaction solution by bubbling at the rate of 0.4 g./min. for about 1 hour and the temperature maintained at 30°–35° C. An excess of about 28 mole percent phosgene was used. The copolymer was precipitated and washed with isopropanol and had an intrinsic viscosity of 0.87. The softening temperature was 200°–220° C. Clear, colorless films cast from chloroform solution of the material were tough and strong, having a tensile strength at 25° C. of 9270 p.s.i. and an elongation of 10%.

Example 2

The reaction vessel was charged with a solution of 45.6 g. (0.20 mole) Bisphenol-A and 40.0 g. (0.01 mole, 4.8 mole percent, 47 weight percent) of Carbowax 4000 in 500 cc. dry pyridine. Carbowax 4000 is a polyethylene glycol having a molecular weight of about 4000 and is sold by the Carbide and Carbon Chemical Company (now Union Carbide Corporation), as are all the other Carbowax materials mentioned herein. Phosgene was added with stirring to the above mixture at the rate of 0.40 g./min. for 1.1 hours at which time an excess of about 37 mole percent of phosgene was added and the reaction mixture became very viscous. The mixture was stirred for 2.5 hours after the phosgene addition. The copolymer was precipitated in a Waring Blendor using isopropanol and also washed with this alcohol to give a finely divided copolymer having an intrinsic viscosity of 1.15. The copolymer was essentially colorless and was elastic and soluble in such solvents as chloroform, dioxane, methylene chloride, tetrachlorethane, chlorobenzene, tetrahydrofuran, etc. The material had a softening point of 190°–205° C. and was readily transfer and compression molded at 200° C.

Example 3

Example 2 was repeated except there were used 45.6 g. (0.20 mole) Bisphenol-A and 20.0 g. (0.005 mole, 2.4 mole percent, 30 weight percent) of Carbowax 4000 and 500 cc. of dry pyridine. About 30 mole percent excess of phosgene was added at the rate of 0.40 g./min. to produce a viscous reaction mixture. The isopropanol precipitated and washed copolymer was finely divided and had an intrinsic viscosity of 1.03. When films were cast from a chloroform solution of this material, they were not as elastic as were those of Example 2. The copolymer softened at 195°–205° C., transfer molded at 195° C. and compression molded readily at 200° C.

Example 4

Example 2 was repeated using 45.6 g. (0.20 mole) Bisphenol-A, 5.0 g. (0.0013 mole, 0.6 mole percent, 9.9 weight percent) Carbowax 4000 and 400 cc. dry pyridine. An excess of 14 mole percent phosgene was used. When precipitated with isopropanol, the resin had an intrinsic viscosity of 0.82. The softening temperature was 200°–210° C.

Example 5

Example 2 was repeated using 22.8 g. (0.10 mole) of Bisphenol-A, 40.0 g. (0.01 mole, 9.1 mole percent, 64 weight percent) Carbowax 4000 and 400 cc. dry pyridine. An excess of about 50 mole percent phosgene was used. The intrinsic viscosity as precipitated from isopropanol was 1.03. Films cast from a chloroform solution were highly elastic. The softening temperature of the copolymer ranged from 170°–190° C.

Example 6

Example 2 was repeated except that 45.6 g. (0.20 mole) Bisphenol-A and 40.0 g. (0.02 mole, 9.1 mole percent) of polypropylene glycol having a molecular weight of 2000 and 500 cc. of dry pyridine were used. An excess of about 27 mole percent phosgene was employed. The isopropanol precipitated copolymer had an intrinsic viscosity of 0.20 and softened at 160°–190° C.

Example 7

Phosgene was added as in Example 2 to a solution of 45.6 g. (0.20 mole) Bisphenol-A in 400 cc. of dry pyridine until the mixture became viscous. A solution of 20.0 g. (0.005 mole, 2.4 mole percent) of Carbowax 4000 in 100 cc. of dry pyridine was then added to the reaction mixture with further addition of phosgene. When the reaction mixture had become very viscous, the copolymer was precipitated with isopropanol. The intrinsic viscosity was 0.90, the softening temperature 165°–200° C.

Example 8

Example 7 was repeated except that the Bisphenol-A-phosgene reaction mixture had not become very viscous when the Carbowax 4000 solution was added. The resulting copolymer had an intrinsic viscosity of 0.82, a softening temperature of 175°–190° C.

The organic polyisocyanate materials useful in connection with the present invention are well known in the art. Among those which may be so used are alkylene diisocyanates, such as ethylene diisocyanate, trimethylene diisocyanate, hexamethylene diisocyanate, propylene-1,2 diisocyanate and cycloalkalene diisocyanates, aromatic diisocyanates, such as toluene-2,4-diisocyanate, napththalene diisocyanate, etc. Besides the diisocyanates the corresponding higher isocyanates also are useful, typical of which are triphenylmethane triisocyanate, benzene triisocyanate, toluene triisocyanate, ethylene tetraisocyanate, diphenyl triisocyanate etc.

In general from about 0.1 to 10 weight percent of diisocyanate material based on the weight of the polycarbonate copolymer is added to the polycarbonate. The diisocyanate may be incorporated with the polycarbonate material by mixing the divided materials dry at room temperature in any suitable manner or at any temperature up to the curing temperature. For example, the materials may be milled together, tumbled in a mixer, or alternatively an article cast or molded from the polycarbonate material may be impregnated with the diisocyanate material in liquid or vapor form. Another method of mixing the isocyanate material with the polycarbonate material involves mixing solutions of the two materials together and casting the cross-linked article therefrom.

Although the nature of the reaction taking place between the copolymer material and the diisocyanate is not thoroughly understood, it appears that the most obvious reaction mechanism would involve the terminal hydroxyl functions of the polymeric material. This type of reaction occurs in the preparation of polyurethane rubbers and may involve chain extension as well as cross-linking. Relatively low molecular weight hydroxyl terminated polyethers and polyesters are normally employed in polyurethane preparations whereas the copolymers used herein generally have a very high molecular weight with few terminal hydroxyl functions. Despite this, a high degree of property modification involving loss of thermoplastic character and solubility is observed. It is possible that at least some isocyanate-polymer reactions occur at a non-terminal position on the polymer chain.

The curing of the materials of this invention, of course, involves a time temperature relationship. At temperatures as low as 50 to 100° C. from about 2 to 24 hours are used to cure the material. At higher temperatures ranging from about 100 to 200° C. cure times are reduced in some instances to a matter of a few seconds or minutes.

Example 9

There were mixed together in the finely divided state a copolymer material as set forth above in Example 2 but prepared using 50 weight percent Carbowax 4000 and 5 weight percent of toluene-2,4-diisocyanate. After thorough mixing, a film of the material was cast from a solution of the material in dichloromethane. The film was found to be soluble in chloroform after air drying at 25° C. for 17 hours. However, after 24 hours at 80° C. in an air circulating oven, the copolymer film had become infusible and insoluble in chloroform denoting that it had been cured.

The materials of the invention are very useful in molding powder formulations either alone or in combination with fillers such as woodflour, diatomaceous earth, silica, carbon black etc. to make molded forms of various shapes. They are also useful in preparing gaskets, tubing and other materials which are solvent and heat resistant. Films of the materials prepared in conventional ways are useful as wrapping or packaging materials, containers, covers, closures, tapes of various types such as insulating tapes and pipe coverings etc. Films and fibers of the material can be beneficially oriented or stretched at elevated temperatures. The fibrous form of the material can advantageously be used for yarn, thread, bristles, rope etc. The present materials can be used as surface covers for appliances and the like or as coatings for rods and wire as dynamo-electric machine slot insulation and as a bonding material for parts or laminates and an adhesive formulation. They are efficacious in wire enamels, varnishes and paints and can be readily mixed with pigments, stabilizers, plasticizers, etc. The present materials can also be alloyed with other compositions.

What I claim as new and desire to secure by Letters Patent of the United States is:

1. The reaction product of a high molecular weight, resinous polycarbonate of a mixture of a dihydric phenol and a polyalkylene glycol, and a diisocyanate.
2. The reaction product of claim 1 in which the dihydric phenol is 2,2-bis-(4-hydroxyphenyl)-propane.
3. The reaction product of claim 1 in which the glycol is polyethylene glycol.
4. The reaction product of claim 1 in which the diisocyanate cross-linking agent is toluene diisocyanate.
5. The reaction product of claim 1 in the form of electrical insulating material.
6. The reaction product of claim 1 in the form of a fiber.
7. The reaction product of claim 1 in the form of a film.
8. The reaction product of a high molecular weight, resinous polycarbonate of a mixture of a dihydric phenol and a polyalkylene glycol, and from 0.1 percent to 10 percent by weight of a diisocyanate, based on the weight of the polycarbonate.
9. A process for preparing a high molecular weight, resinous polycarbonate copolymer which comprises reacting, under polycarbonate-forming conditions, a carbonate precursor selected from the group consisting of carbonate esters, haloformates, and carbonyl halides, with a dihydric phenol and a polyalkylene then reacting glycol, and said reaction product with a diisocyanate.

References Cited in the file of this patent

FOREIGN PATENTS

| | | |
|---|---|---|
| 546,375 | Belgium | Mar. 23, 1956 |
| 650,002 | Great Britain | Feb. 7, 1951 |
| 1,155,285 | France | Apr. 24, 1958 |